(12) United States Patent
Minakawa et al.

(10) Patent No.: US 7,100,186 B1
(45) Date of Patent: Aug. 29, 2006

(54) DEFAULT SOURCE SETUP FOR CHANNEL NUMBERS

(75) Inventors: Yumiko Minakawa, Ibaraki-ken (JP);
Jenny S. Chow, San Diego, CA (US);
Tara Burnhouse, San Diego, CA (US);
Yuko Nishikawa, La Jolla, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/470,100

(22) Filed: Dec. 21, 1999

(51) Int. Cl.
*H04N 5/445* (2006.01)

(52) U.S. Cl. .......................... 725/59; 348/731; 725/49

(58) Field of Classification Search ................ 725/48, 725/49, 47; 348/731, 732
See application file for complete search history.

(56) References Cited

U.S. PATENT DOCUMENTS 6,133,910 A * 10/2000 Stinebruner .................. 725/49
6,359,580 B1 * 3/2002 Morrison .................... 348/731
6,529,680 B1 * 3/2003 Broberg ........................ 386/83

* cited by examiner

*Primary Examiner*—Chris Kelley
*Assistant Examiner*—James Sheleheda
(74) *Attorney, Agent, or Firm*—Blakely Sokoloff Taylor & Zafman, LLP

(57) ABSTRACT

A system and method for providing a default source to program channel numbers. In one embodiment, the system allows a user to program over-lapping channel numbers to a selected default source. The system includes at least one channel number usable by a plurality of sources for providing a station to transmit television programs. The system generates an electronic system guide identifying the plurality of sources. The system allows a user to select one of the plurality of sources from the electronic system guide as a default source. The system programs the at least one channel number to tune to a station for receiving television programs provided by the selected default source numbers. The system the programs the over-lapping channel numbers to tune to a station provided by the selected second default source and program any non-over-lapping channel numbers to tune to a station provided by the selected first default source.

14 Claims, 4 Drawing Sheets

Pop-up for Cable/Satellite overlap:

Pop-up for Local TV antenna/Satellite overlap:

DEFAULT SOURCE SETUP FOR CHANNEL NUMBERS

FIELD OF THE INVENTION

The present invention is directed to a system and method that receives television programs from multiple sources. More particularly, the present invention is directed to a system and method for programming channel numbers to a default source.

BACKGROUND OF THE INVENTION

Within the past decade, the variety of sources for providing television programs have increased dramatically. Today television programs are transmitted using analog or digital signals through airwaves, cable, and satellites. As such, a user is capable of tuning to stations providing television programs that may originate from multiple sources through a receiver or set-top box. For example, a user may have set-top box connected with a local antenna to receive television programs broadcasted through the airwaves. The set-top box may also receive television programs via a cable connection. In addition, the set-top box may receive television programs through a satellite system, for example, the RCA Direct Satellite System™ or DSS™ (Direct Satellite System and DSS are trademarks of Hughes Communications, a division of General Motors).

Because each source includes a number of stations for providing television programs, the number of stations available to a user has increased from one to hundreds of stations. For each station, there is a corresponding channel number that is used to tune to the station. Consequently, the number of channel numbers available to a user is limited. As a result, a user receiving multiple sources for providing television programs may have a channel number that may tune to multiple stations from different sources. In such a case, the channel number is considered "over-lapping."

In prior systems, channel numbers, which may include over-lapping channel numbers, are designated to a default source based on which source the set-top box is configured to receive. That is, a user must press a switch or button on the set-top box to change the default source. Consequently, in such prior systems, the ability to select a default source is not seamlessly integrated and a user is unable to select easily a default source for programming channel numbers.

SUMMARY OF THE INVENTION

A system and method, which are seamlessly integrated, for allowing a user to select a default source to program channel numbers are disclosed. In one embodiment, the system provides a simple to use electronic system guide that allows a user to select a default source to program over-lapping channel numbers to the default source. The system includes at least one channel number usable by a plurality of sources for providing a station to transmit television programs. The system generates the electronic system guide identifying the plurality of sources. The system allows a user to select one of the plurality of sources as the default from the electronic system guide. The system programs the at least one channel number to tune to a station for receiving television programs provided by the selected default source.

In another embodiment, the system provides an electronic system guide that allows a user to select default sources to program automatically channel numbers. The system allows a user to select a first default source to program channel numbers. The system determines if there are over-lapping channel numbers, which are usable by a plurality of sources. If there are no over-lapping channel numbers, the system programs the channel numbers to the selected first default source. If there are over-lapping channel numbers, the system lists the plurality of sources that may use the over-lapping channel numbers. The system allows a user to select a second default source among the listed plurality of sources to program the over-lapping channel numbers. The system then programs the over-lapping channel numbers to tune to a station provided by the selected second default source and programs any non-over-lapping channel numbers to tune to a station provided by the selected first default source.

BRIEF DESCRIPTION OF THE DRAWINGS

The objects, features, and advantages of the present invention will be apparent to one skilled in the art from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
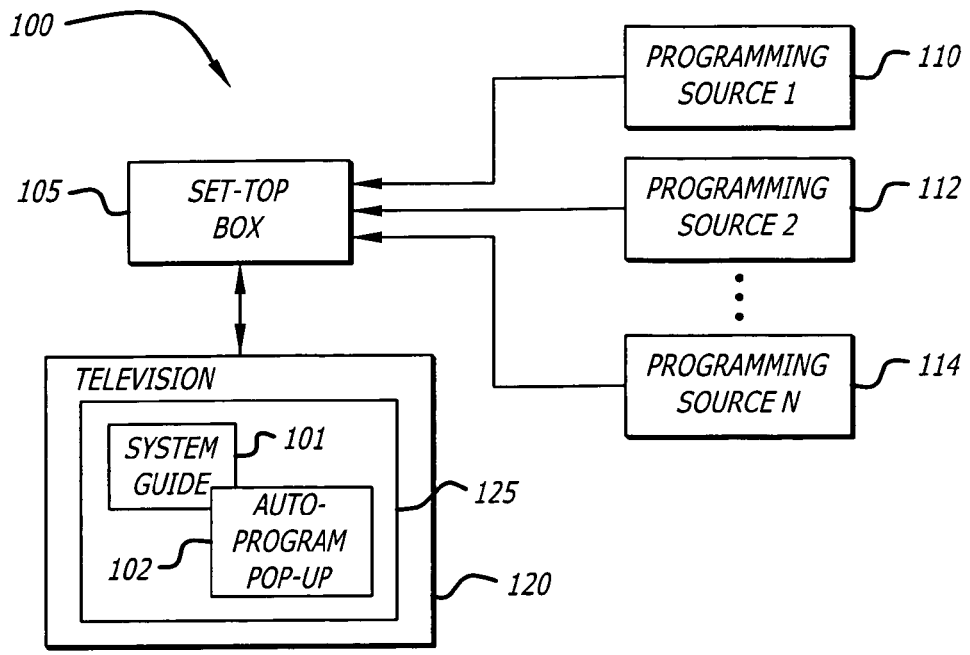
FIG. 1 is a simplified block diagram illustrating one embodiment of the system of the present invention.
Figure 1:
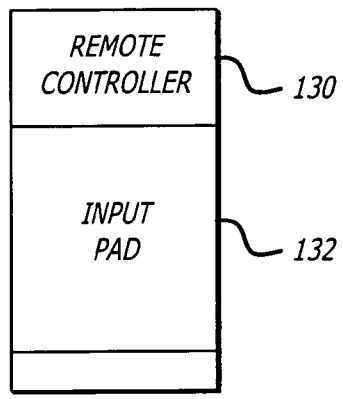

The system of the present invention provides a seamlessly integrated and simple to use electronic system guide to select a default source to program channel numbers. The electronic system guide is displayed to a user as a graphical user interface. The graphical user interface allows a user to select easily a default source for programming channel numbers. The electronic guide also allows a user to select a default source for programming over-lapping channel numbers. A simplified block diagram of the system is illustrated in FIG. 1. Referring to FIG. 1, system 100 includes a set-top box 105, television 120, remote controller 130, and a plurality of programming sources 1 (110) through N (114).

Set-top box 105 is a receiver of television signals for television 120. Set-top box 105 is configured to receive television signals from programming sources 1 (110) through N (114). For example, programming sources 1 (110) through N (114) may be local TV antenna source, cable source, or a satellite source that transmit signals to set-top box 105 through a local antenna, cable connection, and satellite system, such as, for example, the DSS™ system. Set-top box may receive digital or analog signals from programming sources 1 (110) through N (114) through the local antenna, cable connection, and satellite system. Each programming source also includes a number of stations that transmit television programs using a television signal for a specific channel utilized by television 120. Set-top box 105 is also configured to program channel numbers for television 120 to tune to a station for receiving television programs provided by one of programming sources 1 (110) through N (114).

Set-top box 105 is also configured to generate system guide 101 on display 125 of television 120. System guide 101 is a graphical user interface to provide a user the capability to configure the system. For example, system guide 101 may provide a number of options for a user to select, such as, for example, a local station setup that allows a user to select a default source in programming channel numbers for television 120 to tune to stations provided by the selected default source. For example, a user can select programming source 1 (110) as a default source to program the channel numbers. Although the set-top box 105 is illustrated as a separate device coupled between television 120 and programming source 1 (110) through programming source N (114), it is apparent that its functionality may be incorporated in other devices including television 120.

System guide 101 also provides an auto-program pop-up 102. Auto-program pop-up 102 is pop-up menu or sub-menu within system guide 101 that provides a user the option to program automatically ("auto-program") the channel numbers for television 120 and to determine if there are over-lapping channel numbers. Over-lapping channel numbers are channel numbers that may be used by a plurality of programming sources. For example, programming source 1 (110) and programming source 2 (112) may both provide a station that tunes to channel number 100. In such a case, channel number 100 is over-lapping. If there are over-lapping channel numbers, auto-program pop-up 102 provides a user the capability to select a default source for the over-lapping channel numbers. After a user selects a default source, the over-lapping channel numbers are programmed by the set-top box 105 to tune to a station provided by the selected default source.

Remote controller 130 is a control device for a user to provide inputs to television 120 and set-top box 105. Remote controller 130 includes input pad 132 that may have alpha-numeric keys, options keys, function keys, and other like keys to operate set-top box 105 and television 120. Typically, input pad 132 includes a menu key that displays a system menu having an option for system guide 101 or the input pad 132 may have a separate key to access directly system guide 101.

Figure 2:
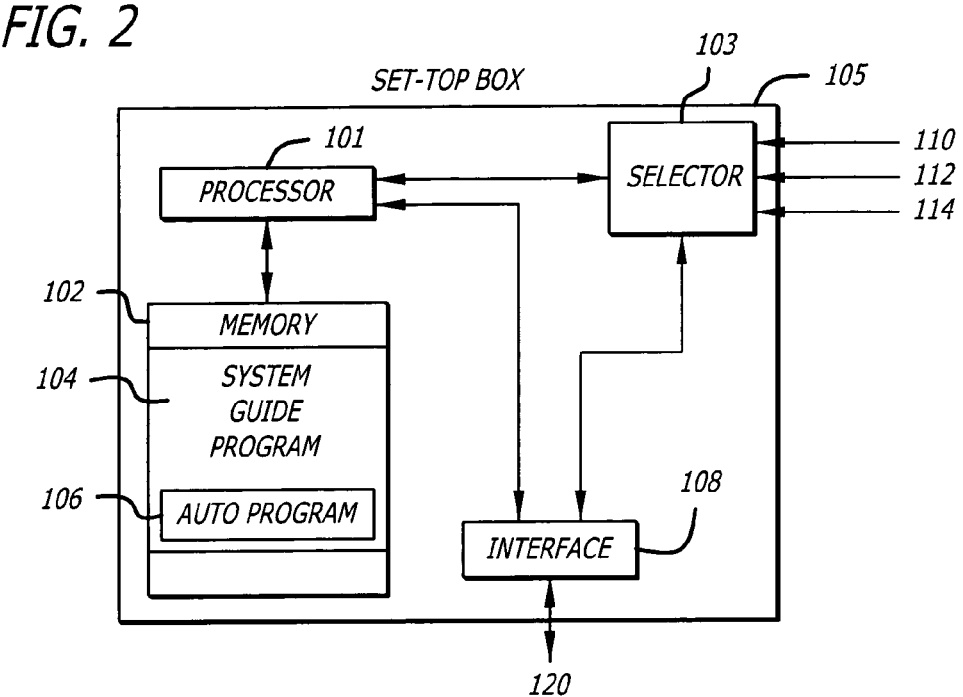
FIG. 2 is a simplified block diagram of one embodiment of a set-top box that provides an electronic system guide in accordance with the teachings of the present invention.

FIG. 2 is a simplified block diagram of one embodiment of a set-top box 105 in FIG. 1. Referring to FIG. 2, set-top box 105 includes a processor 201, selector 203, interface 208, and memory 202. Processor 201 is coupled with selector 203, memory 202, and interface 208. Selector 203 receives inputs from programming source 1 (110) through N (114) and outputs a selected television signal based on one of the inputs to interface 208. Interface 208 couples processor 201 and selector 203 with television 120.

Memory 202 stores system guide program 204 and auto-program 206. Memory 202 may store other programs such as, for example, a programming guide. Memory 202 may include, for example, read only memory (ROM), random access memory (RAM), flash memory, or any other suitable memory. System guide program 204 is executable instructions used by processor 201 to generate an electronic system guide such as system guide 101 on display 125 of television 120. System guide program 204 may also include executable instructions used by processor 201 to program channel numbers for television 120 to tune to a station provided by a selected input of selector 203 as a default source.

In one embodiment, system guide 101 includes a local station setup option that allows a user to program channel numbers for television 120. Within local station setup, system guide 101 may provide an "auto-program" option to program automatically ("auto-program") the channel numbers for television 120. Thus, auto-program 206 is executable instructions used by processor 201 to generate auto-program pop-up 102 that allows a user to select a default source to auto-program the channel numbers for television 120. Auto-program 206 may also include executable instructions used by processor 201 to instruct selector 203 to select a specified input to derive an output television signal to television 120 through interface 208. For example, auto-program 206 generates auto-program pop-up 102 to allow a user to select a first default source among one of programming sources 1 (110) through N (114) to auto-program the channel numbers for television 120. Auto-program 206 may also be used to determine if there are over-lapping channel numbers. If there are no over-lapping channel numbers, auto-program 206 may be used to auto-program the channel numbers to tune to a station provided by the first selected default source. If there are over-lapping channel numbers, auto-program 106 may be used to list the plurality of sources that may use the over-lapping channel numbers and allow a user to select a second default source among the listed plurality of sources to auto-program the over-lapping channel numbers. Auto-program 106 may be used to auto-program the over-lapping channel numbers to tune to a station provided by the selected second default source and auto-program any non-over-lapping channel numbers to tune to a station provided by the selected first default source.

Processor 201 is the central processing unit for set-top box 105. Processor 201 is responsible for generating system guide 201 and auto-program pop-up 102 and to control selector 203. Processor 201 is also responsible for processing instruction code contained within system guide program 204 and auto-program 206 within memory 202. Processor 201 may also be responsive to inputs by a user. For example, a user may initiate the system guide 101 by pressing specified keys on input pad 132 of remote controller 130. If a user initiates system guide 101, processor 201 will then execute system guide program 204 to generate a graphical user interface on display 125 to the user.

Figure 3:
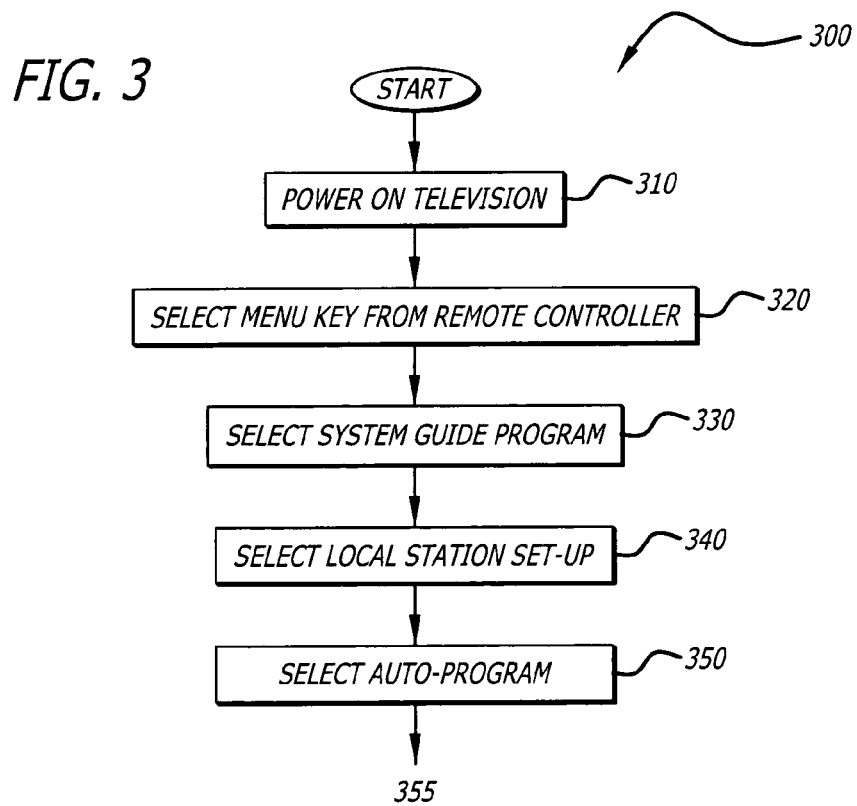
FIG. 3 is a flow chart illustrating one embodiment of the process for providing a default source to program channel numbers.

FIG. 3 is a flowchart illustrating one embodiment of the process for programming channel numbers for television 120. At step 310, a user powers on television 120. At step 320, a user selects a menu key on input pad 132 of remote controller 130. A graphical user interface having a menu appears on display 125 listing options for a user to select such as, for example, a "System Guide" option. At step 330, the user using remote controller 130 selects the system guide option that displays system guide 101 on display 125. System guide 101 may display other options such as, for example, a local station set-up option. At step 340, the user using remote controller 130 selects the local station set-up option for programming the channel numbers to television 120. System guide 101 may display an option such as, for example, an "Auto-Program" option to auto-program channel numbers for television 120. At step 350, the user using remote controller 130 selects the auto-program option that displays auto-program pop-up 102 on display 125. The user can then select a default source among programming sources 1 (110) through N (114) to auto-program the channel numbers for television 120 to tune to a selected default source.

Figure 4:
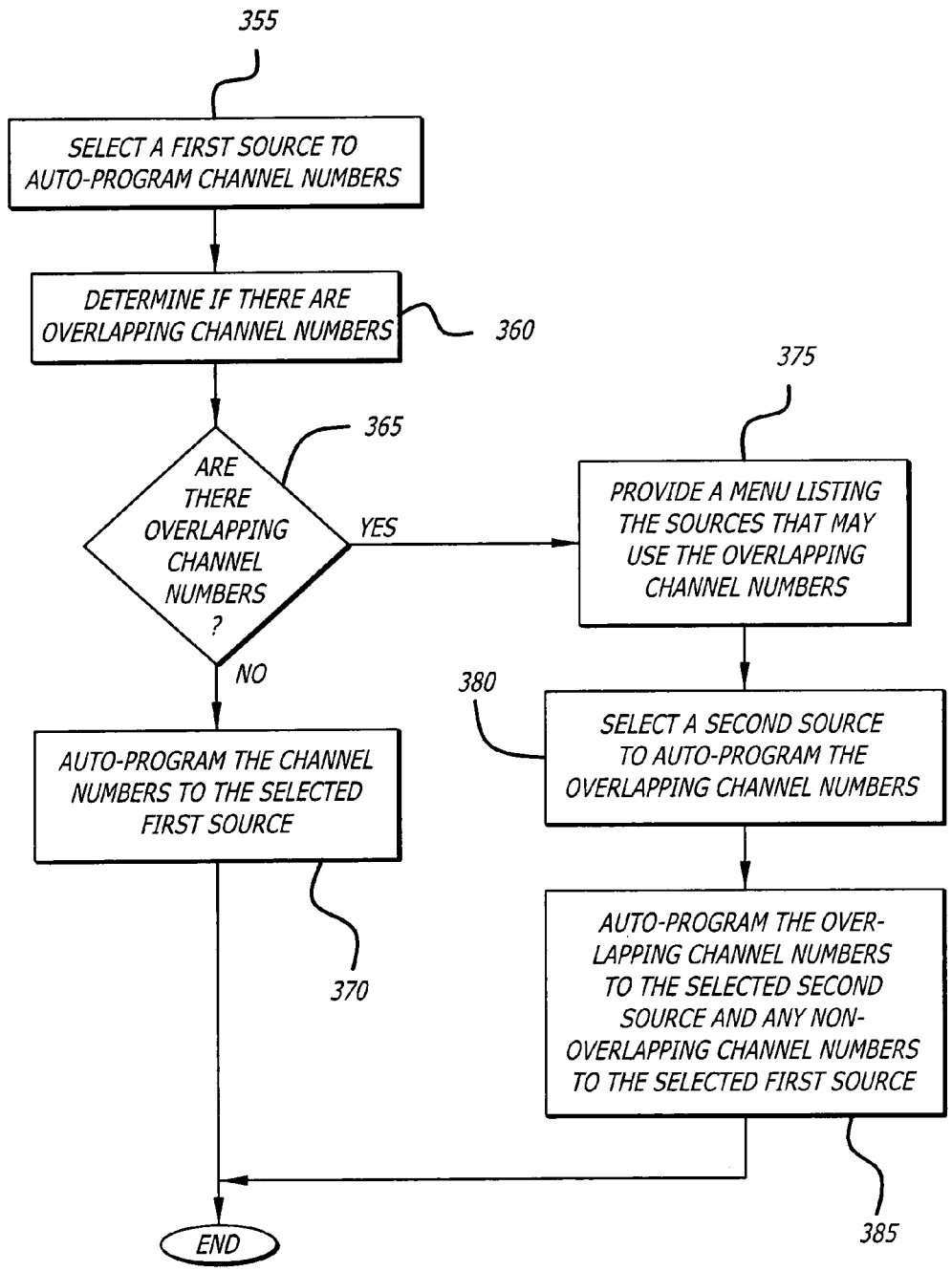
FIG. 4 is flow chart illustrating one embodiment of the process for providing default sources to program automatically channel numbers.

FIG. 4 is a flowchart illustrating one embodiment of the process for the auto-program option. At step 355, auto-program pop-up 102 is displayed to provide a user a list of sources to select as a first default source. For example, a user may select a cable source, local TV antenna source, or a satellite source as a first default source to program channel numbers for television 120 to tune to a station provided by the selected first default source. The user using remote controller 130 selects a first default source among the listed sources. At step 360, processor 101 within set-top box 105 determines if there are over-lapping channel numbers for television 120. At step 365, if there are over-lapping channel numbers the process continues at step 375 otherwise the process continues to step 370.

If there are over-lapping channel numbers, at step 375, processor 201 generates a menu listing sources for the user to select as a second default source that provide stations to the over-lapping channel numbers. For example, a user may select a cable source, local TV antenna source, or a satellite source as a second default source to program the over-lapping channel numbers for television 120 to tune to a station provided by the selected second source. At step 380, a user selects a second default source to auto-program the over-lapping channel numbers. At step 385, processor 101 executes auto-program 106 to auto-program the over-lapping channel numbers to the selected second source and any non-over-lapping channel numbers to the selected first default source. At step 370, if there are no over-lapping channel numbers processor 201 executes auto-program 101 to auto-program the channel numbers for television 120 to tune to stations provided by the selected first default source.

Figure 5:
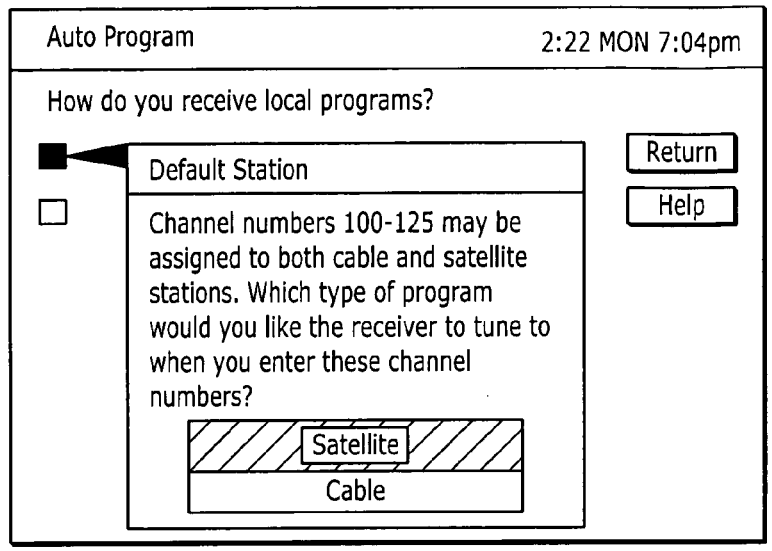
FIG. 5 illustrates one exemplary graphical user interface pop-up window for an electronic system guide that enables a user to select a source for programming over-lapping channel numbers.

FIG. 5 illustrates one exemplary graphical user interface for an auto-program pop-up for the electronic system guide. Referring to FIG. 5, the auto-program pop-up window is for a cable source and satellite source overlap. The pop-up allows a user to select a default source for channel numbers 100–125, which may be used by both a cable and satellite source. For example, if a user selects the satellite source that is highlighted, auto-program will program channel numbers 110–125 to tune to a station provided by the satellite source.

Figure 6:
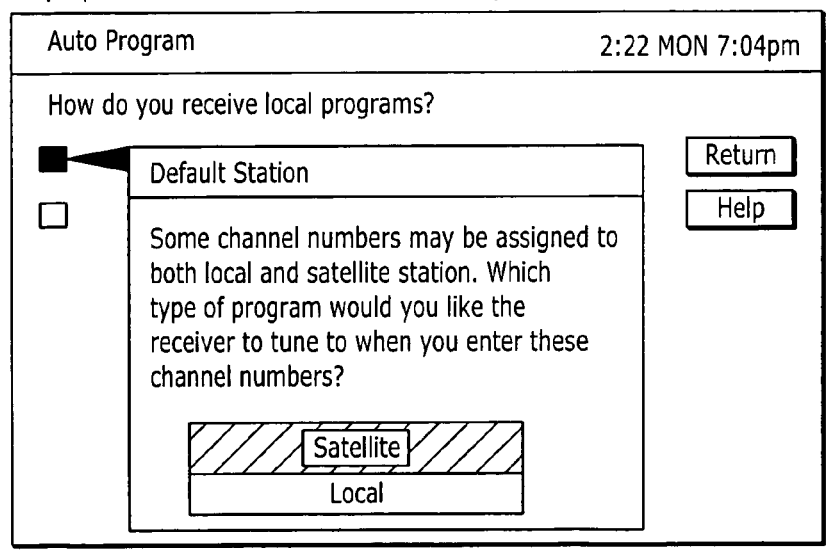
FIG. 6 illustrates one exemplary graphical user interface pop-up window for an electronic system guide that enables a user to select a source for programming over-lapping channel numbers.

FIG. 6 illustrates one exemplary graphical user interface for an auto-program pop-up for the electronic system guide. Referring to FIG. 6, the auto-program pop-up window is for a local TV antenna source and satellite source overlap. The pop-up allows a user to select a default source for channel numbers that be assigned to both local and satellite stations. For example, if a user selects the satellite source that is highlighted, auto-program will program the channel numbers to be assigned to the satellite stations.

Thus, a system and method, which are seamlessly integrated, for allowing a user to select easily a default source to program channel numbers have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for programming a set-top box to tune to stations associated with plurality of channel numbers supported by the set-top box, comprising:

generating an electronic system guide; and displaying a user-selected option within the electronic system guide that, when selected, causes an auto-program to be processed, the auto-program being instructions adapted for:

displaying at least one pop-up for selecting a first source of the plurality of sources from the electronic system guide as a first default source and a second source of the plurality or sources as a second default source, detecting whether each channel number of the plurality of channel numbers associated with an incoming signal is a non-overlapping channel number or an overlapping channel number, and automatically programming each channel number of the plurality of channel numbers to tune to a station for receiving television programs provided by the selected first default source in response to the channel number being a non-overlapping channel number and programming the channel number to tune to a station receiving television programs provided by the selected second default source in response to the channel number being an overlapping channel number.

2. The method of claim 1, wherein the displaying of the at least one pop-up further comprises generating a menu listing a satellite source and a cable source for a user to select the non-overlapping channel number to tune to a station for receiving television programs provided by a selected one of the satellite source and cable source.

3. The method of claim 1, wherein the displaying of the at least one pop-up further comprises generating a menu listing a local TV antenna source and a satellite source for a user to select the non-overlapping channel number to tune to a station for receiving television programs provided by a selected one of the local TV antenna source and the satellite source.

4. The method of claim 1, wherein prior to selecting the second source of the plurality of sources, the method comprising generating a menu listing sources of the plurality of sources, including the second source, for the user to select as the selected second source.

5. A system for providing a default source for a plurality of channel numbers usable by a plurality of sources, comprising:

a processor configured to generate an electronic system guide identifying the plurality of sources; and a selector controlled by the processor to 1) select a first default source of the plurality of sources in response to detecting a non-overlapping channel number for television programs provided by the plurality of sources and automatically program the system to tune to a station for receiving television programs provided by the first default source, and 2) select a second default source of the plurality of sources in response to detecting an overlapping channel number for television programs provided by the plurality of sources and automatically program the system to tune to a station for receiving television programs provided by the second default source, the selector operating on all of the plurality of channel numbers supported by the system.

6. The system of claim 5, wherein the processor is also configured to generate a menu listing a satellite source and a cable source for a user to select such that the at least one channel number tunes to a station for receiving television programs provided by a selected one of the satellite source and cable source.

7. The system of claim 5, wherein the processor is also configured to generate a menu listing a local TV antenna source and a satellite source for a user to select such that the at least one channel number tunes to a station for receiving television programs provided by a selected one of the local TV antenna source and satellite source.

8. The system of claim 5, wherein the television programs are transmitted using one of an analog signal and a digital signal.

9. A system for providing a default source to channel numbers, comprising:
 a processor configured to (1) generate an electronic system guide including an auto-program option to automatically program the channel numbers by a first default source and a second default source, (2) determine if there are overlapping channel numbers among the channel numbers, (3) automatically program each overlapping channel number to nine to the second default source in response to determining there are overlapping channel numbers, and (4) automatically programming any non-overlapping channel number, being the channel numbers that are lot overlapping, to tune to the first default source in response to determining there are non-overlapping channel numbers among the channel numbers; and
 a selector controlled by the processor to (1) select the first default source such that each of the non-overlapping channel numbers tunes to a station for receiving television programs provided by the first default source, and (2) select the second default source such that each of the overlapping channel numbers tunes to a station for receiving television programs provided by the second default source.

10. The system of claim 9, wherein the first default source is one of a local TV antenna source, cable source, and satellite source.

11. The system of claim 9, wherein the second default source is one of a local TV antenna source, cable source, and satellite source.

12. An article of manufacture including one or more computer readable media with executable instructions therein, which, when executed by a processing device causes the processing device to:
 display at least one pop-up for selecting a first source of a plurality of sources from an electronic system guide as a first default source and a second source of the plurality of sources as a second default source,
 detect whether each channel number associated with an incoming signal is a non-overlapping channel number or an overlapping channel number; and
 automatically program each channel number to tune to a station for receiving television programs provided by the selected first default source in response to a corresponding channel number being a non-overlapping channel number and programming each channel number to tune to a station receiving television programs provided by the selected second default source in response to the corresponding channel number being an overlapping channel number.

13. The system of claim 9, wherein the overlapping channel numbers are channel numbers that are used by a first plurality of channel numbers associated with the first default source and a second plurality of channel numbers associated with the second default source.

14. The system of claim 9, wherein the selection of the first default source and the second default source is automatic.

* * * * *